United States Patent [19]

Kerrey

[11] Patent Number: 4,659,542

[45] Date of Patent: Apr. 21, 1987

[54] GRID STRUCTURE FOR NUCLEAR FUEL ASSEMBLY

[75] Inventor: John S. Kerrey, North Columbia, S.C.

[73] Assignee: Westinghouse Electric Corp., Pittsburgh, Pa.

[21] Appl. No.: 657,422

[22] Filed: Oct. 3, 1984

[51] Int. Cl.$^4$ ............................................. G21C 3/34
[52] U.S. Cl. .................................... 376/442; 376/438
[58] Field of Search ................................. 376/438, 442

[56] References Cited

U.S. PATENT DOCUMENTS

| | | | |
|---|---|---|---|
| 3,715,274 | 2/1973 | Venler | 376/442 |
| 3,920,515 | 11/1975 | Ferrari | 376/442 |
| 3,951,739 | 4/1976 | Frick | 376/442 |
| 4,089,743 | 5/1978 | Straalsund | 376/442 |
| 4,306,937 | 12/1981 | Hensolt | 376/442 |

Primary Examiner—Donald P. Walsh

[57] ABSTRACT

A grid structure of slotted straps interfitted at their slots to form cells containing fuel elements or thimbles. The straps are of nonuniform thickness having strips of substantially greater thickness than the regions between the strips. The strips of greater thickness extend parallel to the slots. The straps are joined along these strips of greater thickness. Grids of zirconium alloy resisting crushing are formed by joining intersecting straps by welds in the strips of greater thickness.

7 Claims, 8 Drawing Figures

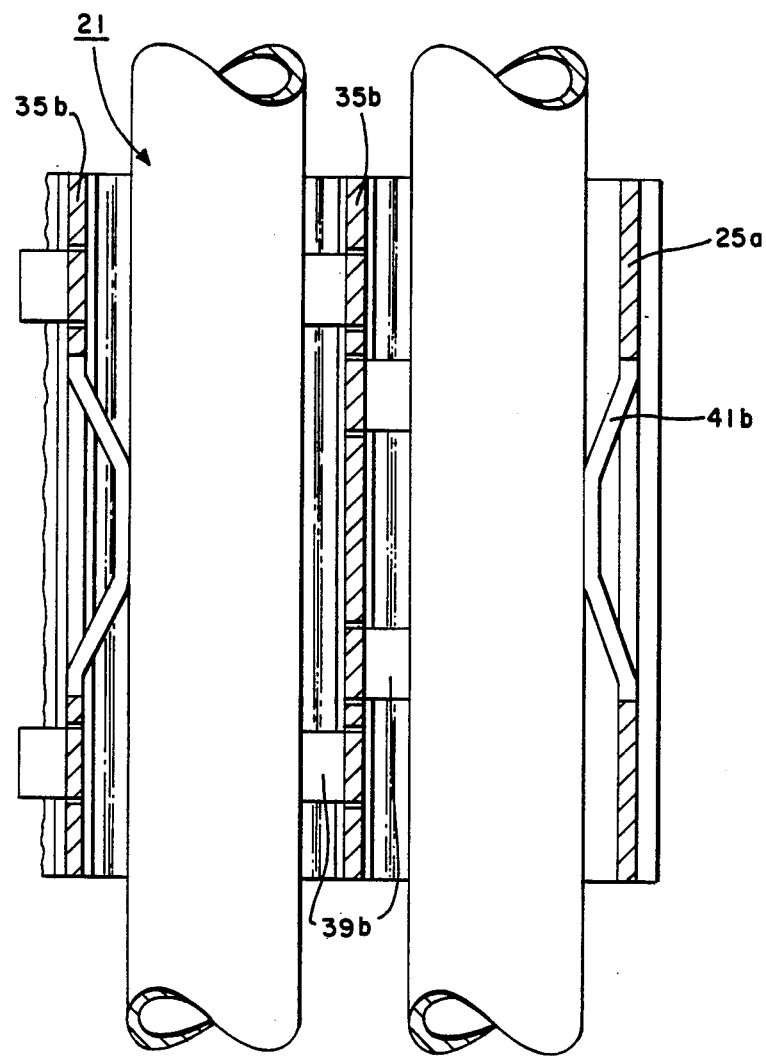
FIG. IA

GRID STRUCTURE FOR NUCLEAR FUEL ASSEMBLY

BACKGROUND OF THE INVENTION

This invention relates to the nuclear reactor art and has particular relationship to facilities for mounting or positioning, with integrity, the nuclear fuel elements or fuel rods of a reactor. It is essential that the fuel elements of each fuel assembly should be laterally supported so that they resist substantial lateral displacement. Displacement would result in nonuniform heat distribution along the fuel elements. There would be peaks of neutron flux and hot spots would develop.

Andrews U.S. Pat. No. Re. 28,079 discloses facilities for mounting and positioning fuel elements in accordance with the teachings of the prior art. As disclosed in Andrews, the lateral support is provided by grids composed of interfitted slotted straps which define cells or channels for the fuel elements. Each strap of one set is interlaced or crossed through its slots with the straps of a second set and each strap of the second set is interlaced or crossed through its slot with the straps of the one set. Each cell is bound by wall sections of the straps. One of a pair of opposite wall sections has a spring and the other has projections or dimples cooperative with the springs. The fuel element in a cell is resiliently urged laterally by the spring in one of each pair of wall sections into engagement with the projections in the opposite of each pair of wall sections and is thus effectively laterally supported. Usually there are a pair of vertically displaced dimples whose region of contact with a fuel element are symmetric with respect to the region of contact of the cooperative springs. To resist buckling and crushing under the pressures in a reactor, the grid structure is rendered rigid by metallurgically joining the crossed straps at their regions of intersection.

In the past practice as taught by Andrews, typically, the straps were composed of stainless steel. It was feasible to join the straps at their intersections by furnace brazing. Stainless steel has a moderately low neutron-absorption cross section (typically about 2 barns for thermal neutrons).

In the interest of improving the efficiency of nuclear reactors, it has become desirable to provide grid structure of straps of a material of substantially lower neutron-absorption cross section and for this purpose zirconium or ZIRCALLOY alloy (typically of a cross section of about 0.17 barns for the thermal neutrons) has been selected. Zirconium of ZIRCALLOY alloy cannot be metallurgically joined by brazing. It is accordingly necessary to form a rigid grid structure of straps of ZIRCALLOY alloy by welding the interfitted straps at their regions of intersection. Typically the joints may be formed by welding with a laser beam but there must be adequate metal to support the weld. The grid structure of Andrews does not lend itself to welding. There is not sufficient metal in the region of intersection to form a strong metallurgical joint. To thicken the metal overall would increment the weight and cost and parasitic neutron losses and also presents problems in the deflection out of the straps of the springs and dimples which are necessary to hold the fuel elements.

It is an object of this invention to overcome the disadvantages of the prior art and to provide a grid structure for laterally supporting fuel elements of a nuclear fuel assembly which shall lend itself readily to being formed into a rigid crush-resistant body by welding at the intersection regions of the straps and shall facilitate the deflection of holding dimples and springs for the fuel elements. It is also an object of this invention to provide a grid structure for laterally supporting fuel elements of a material which does not lend itself to brazing.

SUMMARY OF THE INVENTION

In accordance with this invention the straps which form the grid structure are of nonuniform thickness. The thickness in the regions where the straps are to be joined by welding is substantially greater than the thickness of the remainder of the strap areas. In the practice of this invention the straps have strips of substantial relative thickness which are parallel to the slots through which they are interfitted. Between these strips, the straps have thickness which is substantially smaller. The strips parallel to the slots extend from top to bottom of the straps. The straps are joined metallurgically by welding, typically with a laser beam, at the thick regions. Because the thick strips extend throughout the height of the straps, the straps have substantial strength and thickness. Between the thickened strips the straps are thin; in these thin regions the metal is readily bent or deformed to form the springs and dimples or projections. By reason of the nonuniform thickness of the straps the use of the costly ZIRCALLOY alloy or other material is minimized as are the pressure drop and the neutron parasitic losses.

While this invention has unique advantages for fuel rod supporting grids of zircalloy alloy, it also has advantages for grids of material such as stainless steel in improving crush resistance and reducing parasitic losses. To the extent that this invention is applied to grids of such other materials such application is within the scope of equivalents of this invention.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 1A is a view in section taken along line IA—IA of the internal portion of the grid of FIG. 1 showing the relationship of the springs and dimples on internal straps from whose opposite surfaces dimples extend;

Figure 4:
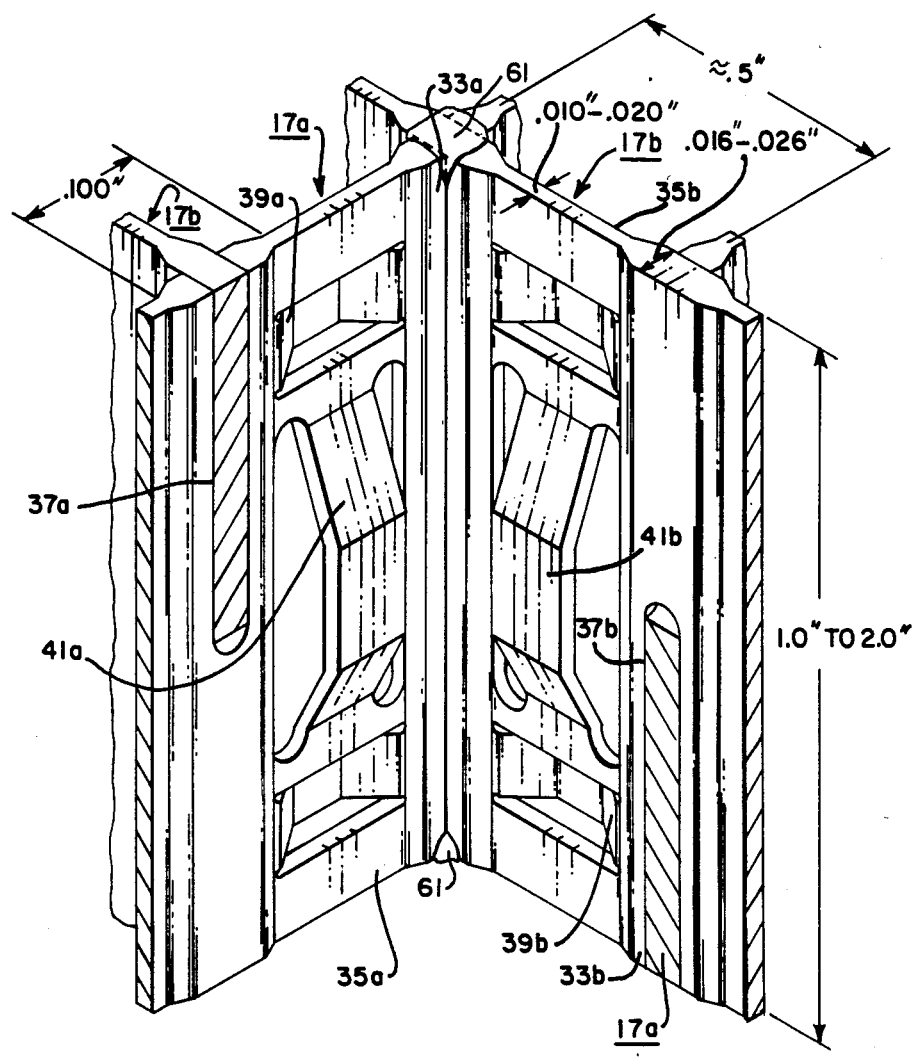
FIG. 4 is a fragmental view in isometric showing the manner in which the grid shown in FIG. 1 is assembled.

Typical approximate dimensions for a grid in accordance with this invention are shown in FIG. 4. These approximate dimensions are shown for the purpose of aiding those skilled in the art in understanding and practicing this invention and not with any intention of in any way restricting this invention.

DETAILED DESCRIPTION OF THE EMBODIMENT

Figure 1:
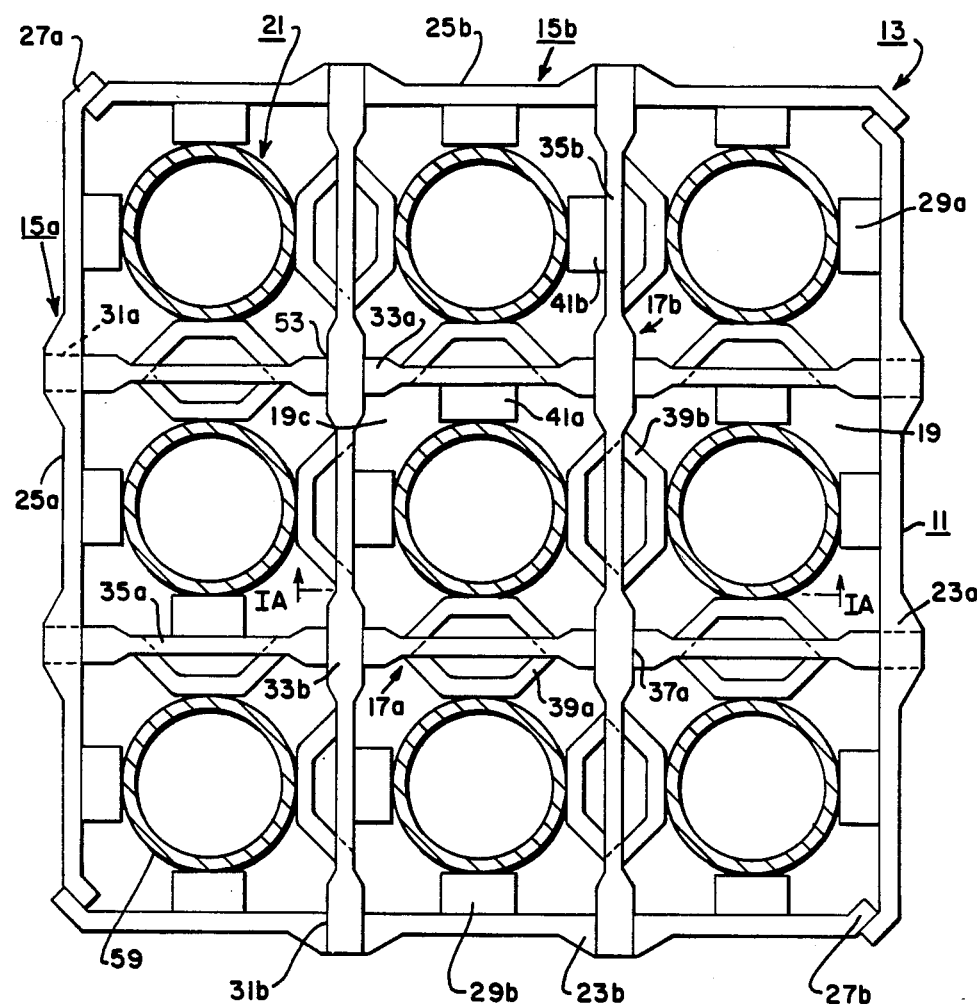
FIG. 1 is a plan view of a grid in accordance with this invention.

The apparatus shown in FIGS. 1 and 1A is a fuel assembly 11 including a plurality of longitudinally extending grids 13 in accordance with this invention. Only one grid 13 is shown. Each grid 13 is formed of a plurality of outer or boundary grid straps 15a and 15b and crossed inner grid straps 17a and 17b defining channels or cells 19 through each of which a fuel rod or fuel element 21 (or a thimble or the like) extends.

Each outer grid strap 15a is of variable cross section including thickened longitudinal strips 23a interposed between thin strips 25a. The thickness of the thin strips 25a may desirably, but need not necessarily, be substantially smaller than the overall thickness of prior art grid straps such as are shown in Andrews. The thickness of the thick strips 23a may desirably, but need not necessarily, be substantially greater than the thickness of the prior art grid straps. Slots 31a extend upwardly from the bottoms of the thickened strips 23a. The straps 15b are similar to the straps 15a except that the slots 31b extend from the top down. Otherwise the straps 15b have, like the straps 15a, thick strips 23b interposed between thin strips 25b. The outer straps 15a and 15b have obtuse-angle bends 27a and 27b at their ends. The bended ends 27a of each strap 15a engages the bended ends 27b of each strap 15b and overlaps or underlaps the engaged end. The engaged ends are joined by welding so that the boundary straps 15a and 15b form a box-like enclosure for the fuel assembly 11. Resilient (spring) fingers 29a and 29b are deflected, knocked or punched out of each thin strip 25a and 25b. Because the strips 25a and 25b are thin the bend radii formed in the fingers 29a and 29b and at their joints with the straps 15a and 15b are relatively small and the deflection to produce the fingers may be effected without producing cracks or fissures in the metal. The desired mechanical resilient properties are more readiy achievable with the thin strips than with thicker straps of the prior art.

Figure 3:
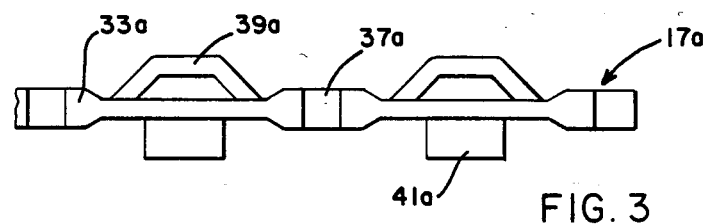
FIG. 3 is a fragmental view in end elevation taken in the direction II—II of FIG. 2.

The inner straps 17a also have thick strips 33a and thin strips 35a interposed between the thick strips. Slots 37a (FIG. 2) extend through the upper ends of the thickened strips 35a. Dimples 39a and springs 41a are deflected at positions horizontally disposed along each thin strip 35a. As shown in FIGS. 1A and 4 (and in FIG. 3 of Andrews) the longitudinal centers of the dimples 39a and springs 41a are aligned with a pair of dimples 39a symmetrically disposed above and below each spring 41a.

The inner straps 17b are similar to the inner straps 17a except that the slots 37b (FIG. 4) extend upwardly from the bottom. Otherwise the straps 17b, like the straps 17a, have thick strips 33b, thin strips 35b, dimples 39b and springs 41b positioned and disposed similarly to the corresponding parts of straps 17a.

Dimples 39a and 39b extend from the opposite surfaces of some of the strips 35a and 35b of some of the straps 17a and 17b, respectively. For example, the straps 17a and 17b which bound the cell 19c in the center of the grid 13 shown in FIG. 1 is of this structure. In this case, the pairs of dimples 39a and 39b extending from the opposite surfaces of each strip 35a and 35b are displaced vertically as shown in FIG. 1A.

Like the boundary straps 15a and 15b the thin strips 35a and 35b of the inner straps 17a and 17b desirably have a thickness substantially smaller than the thickness of prior-art straps and the thicker strips 33a and 33b desirably have a thickness substantially greater than that of the prior art straps. Because the dimples 39a and 39b and the springs 41a and 41b are deflected from the thin strips the bends in the springs and dimples, particularly at their junctions with the strips, have small radii and are not stressed so that they develop cracks and fissures.

Figure 5:
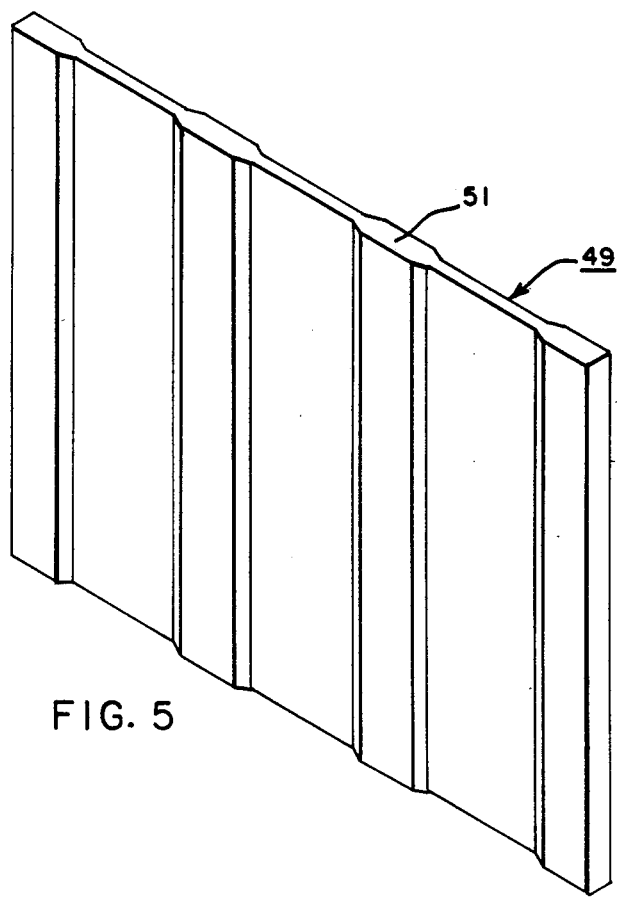
FIG. 5 is a view in isometric showing the manner in which a blank for a grid strap for a grid in accordance with this invention is formed.

The straps 15a, 15b, 17a and 17b are derived from blanks 49 (FIG. 5) formed by rolling appropriately dimensioned plates. The rolling produces lands 51 along the direction of the rolling. The longitudinal centers of the lands 51 are spaced in accordance with the cell or channel pitch of the grids 11 which are formed from the blanks 49. After each blank 49 is rolled the slots 31a, 31b, 37a, 37b, and the dimples 39a and 39b and the springs 41a and 41b are stamped or deflected in the blanks.

The grid 13 is formed into the structure shown in FIG. 1 by latching or interfitting the upwardly and downwardly extending slots 31a, 31b, 37a, and 37b as shown in FIG. 4. The cooperative or interfitted slots are so dimensioned that the regions 53 (FIG. 1) at the top and bottom where the straps 15a and 15b, 17a and 17b intersect are flush.

Figure 2:
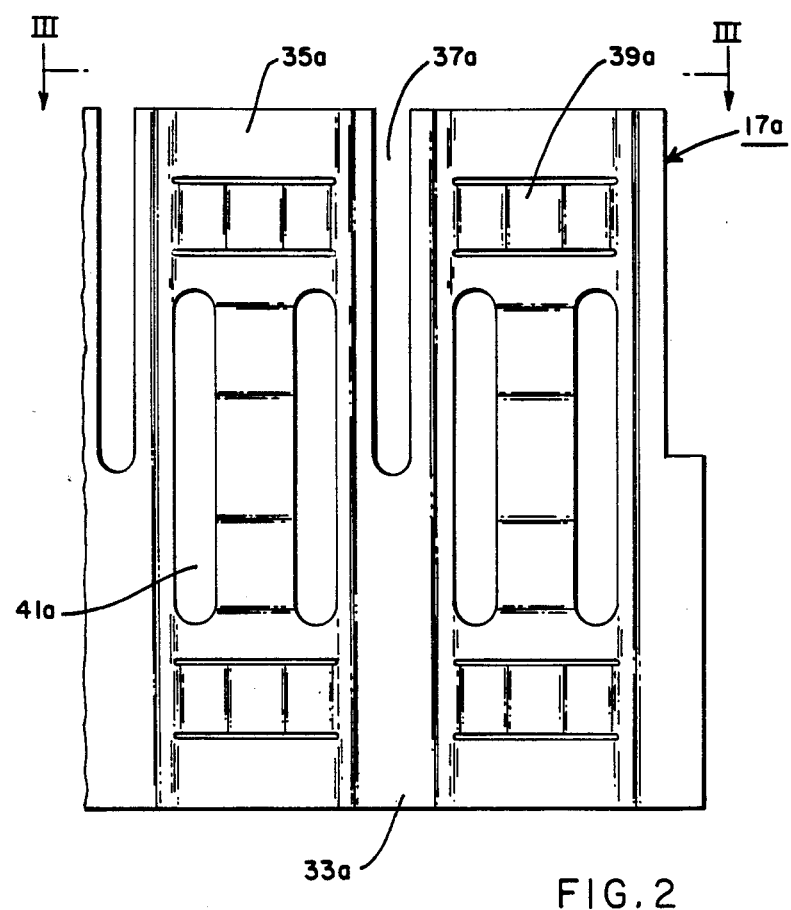
FIG. 2 is a view in side elevation of an inner grid strap of the grid shown in FIG. 1.

As shown in FIG. 2, in each strap 17a a pair of dimples 39a are symmetrically disposed above and below a spring 41a. The spring and dimples extend from opposite straps. The outermost regions, in the direction towards the fuel rods 21, of the surfaces of the dimples 39a, which engage the fuel rods, are spaced equally longitudinally of 35a from the outermost region of the surface of spring 41a which engage the fuel rods. The dimples 39b are likewise symmetrically spaced with respect to spring 41b. The center lines through the outermost regions of the dimples and the center line parallel to a strip 35a or 35b through the outermost region of a spring are centered along the strip 35a and 35b. The dimples 39a and 39b and the springs 41a and 41b in the strips 35a and 35b of separate straps 35a and 35b are in the same corresponding positions on separate straps. The fuel element 21 in a cell 19 is securely held by the force exerted by a spring 41a or 41b on one strap 15a or 15b or 17a or 17b and the dimples 39a or 39b on the opposite strap 17a or 17b which are symmetrically disposed with respect to the spring extending in the opposite direction on the opposite side as shown in FIG. 1. The outermost surfaces of the springs and dimples engage the cladding 59 (FIG. 1) of the fuel rods.

The grid 13 is secured into a rigid structure by welding. While this invention is applicable to grids formed of metals or alloys of any type, it has particular applicability to grids formed of ZIRCALLOY alloy. This alloy does not lend itself to brazing and the joints between the straps cannot be brazed as taught by Andrews. For welding, adequate metal to support the welds is required for this metal is provided by the thickened strips 23a, 23b, 33a and 33b. The grid 13 is formed into a rigid unit by welds 61 (FIG. 4) at the joints of the interfitted slots 31a, 31b, 37a, 37b at the tops and bottoms of the thickened strips. The weld metal is drawn by capillarity into the regions between the strips and solidifies to form the joint.

Figure 6:
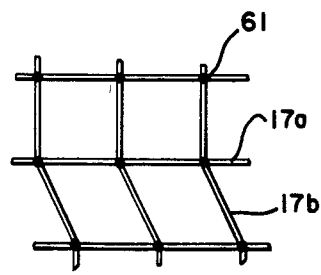
FIGS. 6 and 7 show the manner in which a grid in accordance with this invention may fail under the crushing pressure of the coolant in a reactor.
Figure 7:
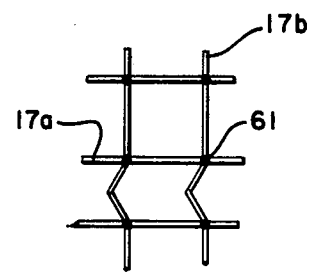

When the grid 11 reacts to the crushing force of the coolant in a reactor, the failed straps tend to be deflected about the welded joints 61 as shown in FIGS. 6 and 7. Because the joints are formed at the thickened portions of the straps, the fixity of the joints against failure is improved.

While preferred embodiments of this invention have been disclosed herein, many modifications thereof are feasible. This invention is not to be restricted except insofar as is necessitated by the spirit of the prior art.

I claim:

1. A grid structure for a fuel assembly of a nuclear reactor, the said assembly including a plurality of nuclear fuel elements, the said structure including a plurality of straps, each of said straps having a plurality of slots extending along one dimension thereof, said slots extending inwardly of the edge along said one dimension, a first set of said straps being interfitted with a second set of said straps by interlacing of each straps of said first set at its slots with the straps of the second set and by the interlacing of each strap of said second set at its slots with the straps of the first set, said straps by the interfitting as aforesaid providing channels within each of which a fuel element is disposed, each channel being bounded by oppositely disposed sections of two pairs of straps, each pair of oppositely disposed sections including resilient means engaging the fuel element in the channel which they bound for supporting the fuel element in said compartment laterally, each of said straps having strips extending coextensively with said slots having a thickness greater than the thickness of said strap between said coextensively extending strips, the interlacing of a strap of said first set and a strap of said second set forming a thick region of intersection of said last-named strap of said first set and said last-named strap of said second set, said first and second straps being joined by welding at each said region of intersection, the said greater thickness of said interlaced straps at said each region of intersection being sufficient to support a weld.

2. The grid structure of claim 1 wherein interfitted straps forming the structure are composed of zirconium alloy which are joined at their regions of intersection by welds.

3. The grid structure of claim 1 wherein the laterally supporting resilient means for the fuel elements includes oppositely disposed spring fingers and dimples, the spring fingers being deflected from the strap surfaces and projecting inwardly of the channels toward the fuel elements and the dimples being formed by deflecting the strap surfaces inwardly of the channels towards the fuel elements, said spring fingers and dimples being deflected from the areas of said straps of lesser thickness, said lesser thickness being such as to facilitate the formation of the spring fingers and dimples without excessively stressing the bends.

4. The grid structure of claim 1 wherein the strips of greater thickness extend throughout the height of the straps and the straps are joined by welds at both ends of the strips.

5. The grid structure of claim 1 wherein the strips of greater thickness extend to at least one end of the interlaced straps and the straps are joined by welding at said one end.

6. The method of making a rigid grid structure for a fuel assembly of a nuclear reactor; the said method comprising rolling a plurality of appropriately dimensioned metal plates producing lands in said plates along the direction of rolling with strips of subtantially smaller thickness than the lands interposed between successive lands, producing slots in the lands of said plates, said slots extending from one end of certain of said plates a predetermined distance along said lands substantially less than the length of said lands and said slots extending from the opposite end of certain other of said plates a predetermined distance along said last-named lands substantially less than the length of said last-named lands, interlacing said certain plates with said certain others of said plates cooperatively at their slots to form compartments between said plates, said interlaced plates forming thickened regions of intersection at their slots, and forming the assembly produced by the interlacing of said plates into a rigid structure by welding at said regions of intersection at at least one end of said assembly, the lands being of such thickness that the thickened regions of intersection contain sufficient metal to support welds.

7. The method of claim 6 wherein the thickened regions of intersection are welded at both ends of the plates.

* * * * *